(No Model.)

R. WIXSON.
Cotton and Corn Scraper.

No. 239,632.          Patented April 5, 1881.

Witnesses:
Fred G. Dieterich
J. W. Littell

Robert Wixson,
Inventor.
by C. A. Snow & Co.,
Att'ys.

N. PETERS, PHOTO-LITHOGRAPHER, WASHINGTON, D. C.

UNITED STATES PATENT OFFICE.

ROBERT WIXSON, OF MILLEDGEVILLE, GEORGIA.

COTTON AND CORN SCRAPER.

SPECIFICATION forming part of Letters Patent No. 239,632, dated April 5, 1881.

Application filed July 9, 1880. (No model.)

*To all whom it may concern:*

Be it known that I, ROBERT WIXSON, of Milledgeville, in the county of Baldwin and State of Georgia, have invented certain new and useful Improvements in Cotton and Corn Scrapers; and I do hereby declare that the following is a full, clear, and exact description of the invention, which will enable others skilled in the art to which it appertains to make and use the same, reference being had to the accompanying drawings, which form a part of this specification.

Figure 1:
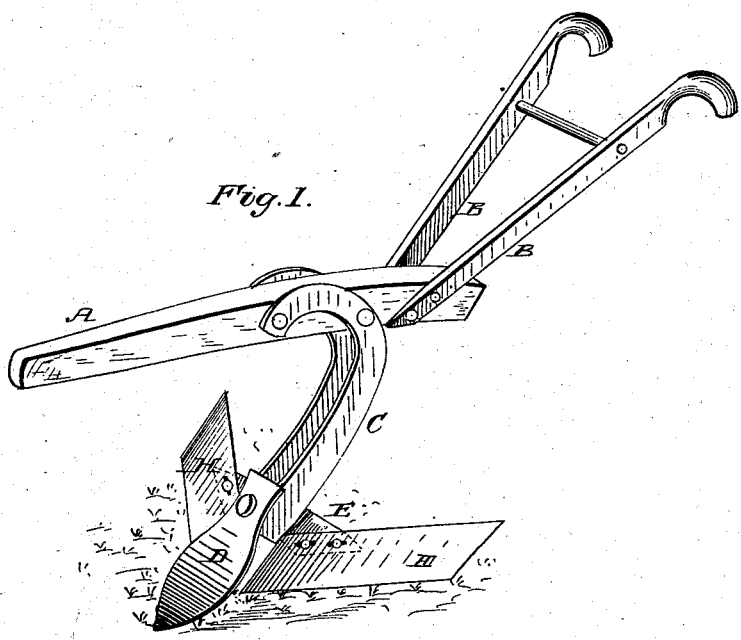
Figure 2:
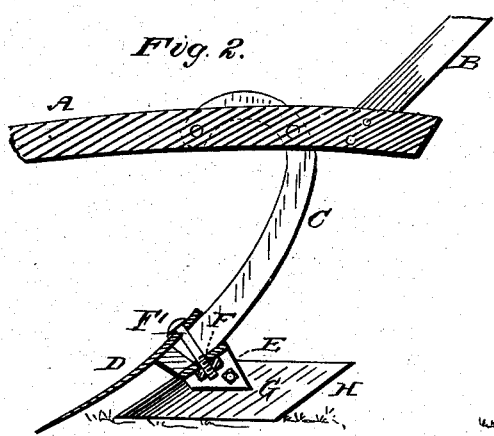
Figure 3:
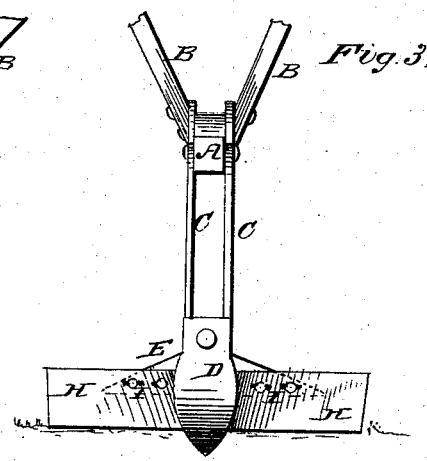
Figure 4:
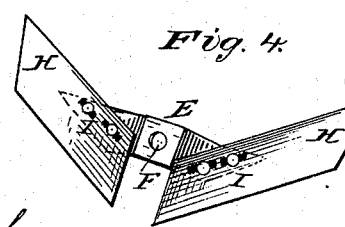

Figure 1 is a perspective view of my improved cotton-scraper. Fig. 2 is a longitudinal sectional view. Fig. 3 is a front view, and Fig. 4 is a view of my improved heel-scraper detached.

Corresponding parts in the several figures are denoted by like letters of reference.

This invention relates to cotton and corn scrapers; and it consists in the improved construction and combination of the plow-standard, the removable plow, and detachable heel sweep or scraper attachment, as will be hereinafter more fully described, and particularly pointed out in the claim.

In the drawings hereto annexed, A represents an ordinary plow-beam, B B the handles, C the standard, and D an ordinary bull-tongue plow, secured upon the said standard in any suitable well-known manner.

My improved attachment or "heel-sweep" is secured to the rear side of the standard by the same fastening which secures the plow, or by some separate fastening device. My said attachment consists of a head, E, of wrought or cast metal, having a centrally-located opening, F, to admit the bolt F', or other fastening, and having its ends G G cut off diagonally and bent at a slight angle to the central portion or body of the head, as shown, for the attachment of the wings or blades constituting the sweep or scraper.

H H are the wings or blades, the upper and lower edges of which are straight and parallel, while the ends are cut off diagonally to the edges, as shown. The lower edges, the position of which, in operation, is horizontal, are sufficiently sharp to cut any grass and weeds which may be growing between the rows of plants. The said wings or blades may be attached to the head in any suitable manner; ordinary bolts or rivets being used, however, I prefer to provide the said wings with horizontal slots, as shown in the drawings at I, having inner serrated edges, this arrangement enabling the said wings to be slid in or out, so as to widen or narrow the gage of the sweep at will. The serrations upon the inner sides of the slots serve to give the fastening-bolts a firm hold.

It should be noted that in any case the width of the bull-tongue plow should exceed the distance between the inner adjoining edges of the wings or blades H H, so as to not only guide and keep them in the ground or to work, but also open between them a furrow of sufficient width to prevent choking or clogging.

From the foregoing description, taken in connection with the drawings hereto annexed, the operation and advantages of my invention will be readily understood. It is simple, durable, easily manipulated, inexpensive, and the wings or blades when worn out may be easily renewed, while the head, upon which there is no wear, will last an indefinite length of time.

It will be observed that the heel-scraper consists of two separate pieces adjustable laterally behind the plow, with which they have no connection except by a common fastening.

The plow can be removed, and the implement may then be used as a scraper, running each side of the row of cotton. The wings or heel-scraper being removed, the plow can be used for the purpose for which plows are usually applied.

Having thus described my invention, I claim and desire to secure by Letters Patent of the United States—

As an improvement in cotton-scrapers, the combination of standard C, removable plow D, detachable scraper attachment E H, and bolt F', whereby the implement is adapted to be used as a plow or a scraper, substantially as specified.

In testimony that I claim the foregoing as my own I have hereto affixed my signature in presence of two witnesses.

ROBERT WIXSON.

Witnesses:
WM. BAGGER,
J. R. LITTELL.